United States Patent
Ito

(10) Patent No.: US 8,446,385 B2
(45) Date of Patent: May 21, 2013

(54) ELECTRONIC DEVICE HAVING TOUCH PANEL AND OPERATING CONTROL METHOD

(75) Inventors: Hiroyuki Ito, Gunma-ken (JP); Masami Ito, legal representative, Niigata-ken (JP); Nobuko Ito, legal representative, Niigata-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 238 days.

(21) Appl. No.: 13/117,781

(22) Filed: May 27, 2011

(65) Prior Publication Data
US 2011/0291973 A1 Dec. 1, 2011

(30) Foreign Application Priority Data
May 28, 2010 (JP) ................ P2010-122515

(51) Int. Cl.
*G06F 3/041* (2006.01)
*G09G 5/08* (2006.01)
(52) U.S. Cl.
USPC .......................................... 345/173; 345/158
(58) Field of Classification Search
USPC .......................... 345/173, 174, 175, 178, 158
See application file for complete search history.

(56) References Cited

U.S. PATENT DOCUMENTS

2007/0030293 A1* 2/2007 Shimizu .................... 345/668
2008/0225007 A1* 9/2008 Nakadaira et al. ............ 345/173

FOREIGN PATENT DOCUMENTS

| JP | 2005-078076 A | 3/2005 |
| JP | 2006-151364 A | 6/2006 |

* cited by examiner

*Primary Examiner* — Michael Faragalla
(74) *Attorney, Agent, or Firm* — Nath, Goldberg & Meyer; Jerald L. Meyer; Stanley N. Protigal

(57) ABSTRACT

An electronic device includes a touch panel, a position detecting portion, an operating control portion and a detection sensitivity control portion. The position detecting portion detects a close coordinate when sensing that a pointing means comes close to a position on a close plane away from the touch panel by a first distance, and detects a contact coordinate when sensing that the pointing means comes close to a position on a contact plane lying closer to the touch panel than the position on the close plane. The operating control portion controls an operation of a controlled unit based on the close coordinate and the contact coordinate. The detection sensitivity control portion switches detection sensitivity of the position detecting portion from close detection sensitivity to contact detection sensitivity when the position detecting portion senses that the pointing means comes close to the position on the close plane.

6 Claims, 13 Drawing Sheets

ELECTRONIC DEVICE HAVING TOUCH PANEL AND OPERATING CONTROL METHOD

BACKGROUND OF THE INVENTION

1. Field of the Invention

The present invention relates to an electronic device having a touch panel and an operating control method.

2. Description of the Related Art

Recently, an electronic device which allows a user to carryout an operation and input using a touch panel has become common. For example, a touch panel is used in an in-car electronic device or a portable electronic device. In such a situation, there is a variety of methods for detecting an operation and input to a touch panel. There is a technology for causing an operation of an electronic device to differ depending on a situation before a user touches a touch panel with his/her finger when the user carries out an operation and input using the touch panel. For example, a patent document (Japanese Published Unexamined Application No.2006-151364) discloses a technology for detecting whether a user carries out an operation from a right or left side of a touch panel and causing an operation of an electronic device to differ depending on the detected information.

Although the technology disclosed in the patent document can detect whether a user carries out an operation from the right or left side of the touch panel, it is necessary to provide the electronic device with an infrared sensor for detecting it, and detect an area where a user touches the touch panel with his/her finger. This brings a complex configuration to increase a cost and a load of calculation.

SUMMARY OF THE INVENTION

The present invention is invented in order to solve the above-described problems, and has an object to provide an electronic device with a simple configuration and an operating control method which cause an operation of the electronic device to differ depending on a situation before a user touches a touch panel.

In order to achieve the above-described object, the present invention provides an electronic device comprising: a touch panel to be operated by a pointing means; a position detecting portion that detects, when sensing that the pointing means comes close to a first position away from the touch panel by a first distance, a first coordinate on the touch panel corresponding to the first position, and detects, when sensing that the pointing means comes close to a second position lying closer to the touch panel than the first position, a second coordinate on the touch panel corresponding to the second position; an operating control portion that controls an operation of a controlled portion based on the first coordinate and the second coordinate; and a detection sensitivity control portion that switches, after the position detecting portion senses that the pointing means comes close to the first position, detection sensitivity of the position detecting portion from first sensitivity to the second sensitivity, wherein the position detecting portion is capable of sensing that the pointing means comes close to the first position in the first sensitivity, and the position detecting portion is capable of sensing that the pointing means comes to close the second position in the second sensitivity.

In order to achieve the above-described object, the present invention provides an operating control method for controlling an operation of an electronic device having a touch panel to be operated by a pointing means, the method comprising: detecting, when sensing that the pointing means comes close to a first position away from the touch panel by a first distance, a first coordinate on the touch panel corresponding to the first position under a situate where detection sensitivity is set to first sensitivity; switching, after sensing that the pointing means comes close to the first position, the detection sensitivity from the first sensitivity to second sensitivity capable of sensing that the pointing means comes to close a second position lying closer to the touch panel than the first position; detecting, when sensing that the pointing means comes close to the second position, a second coordinate on the touch panel corresponding to the second position; and controlling an operation of an controlled portion of the electronic device based on the first coordinate and the second coordinate.

According to the electronic device and the operating control method of the present invention, a different operation can be carried out depending on a situation before a user touches the touch panel under a simple configuration.

DESCRIPTION OF THE EMBODIMENTS

Exemplary embodiments of the present invention will be described below, with reference to FIGS. 1 to 13. It is noted that in each of the exemplary embodiments, a user's finger or a rod-like indicator to be used to operate a touch panel are called as a pointing means, and a direction of an operation and input is a direction in which the pointing means moves at a time when a user carries out an operation and input.

(First Exemplary Embodiment)

Figure 1:
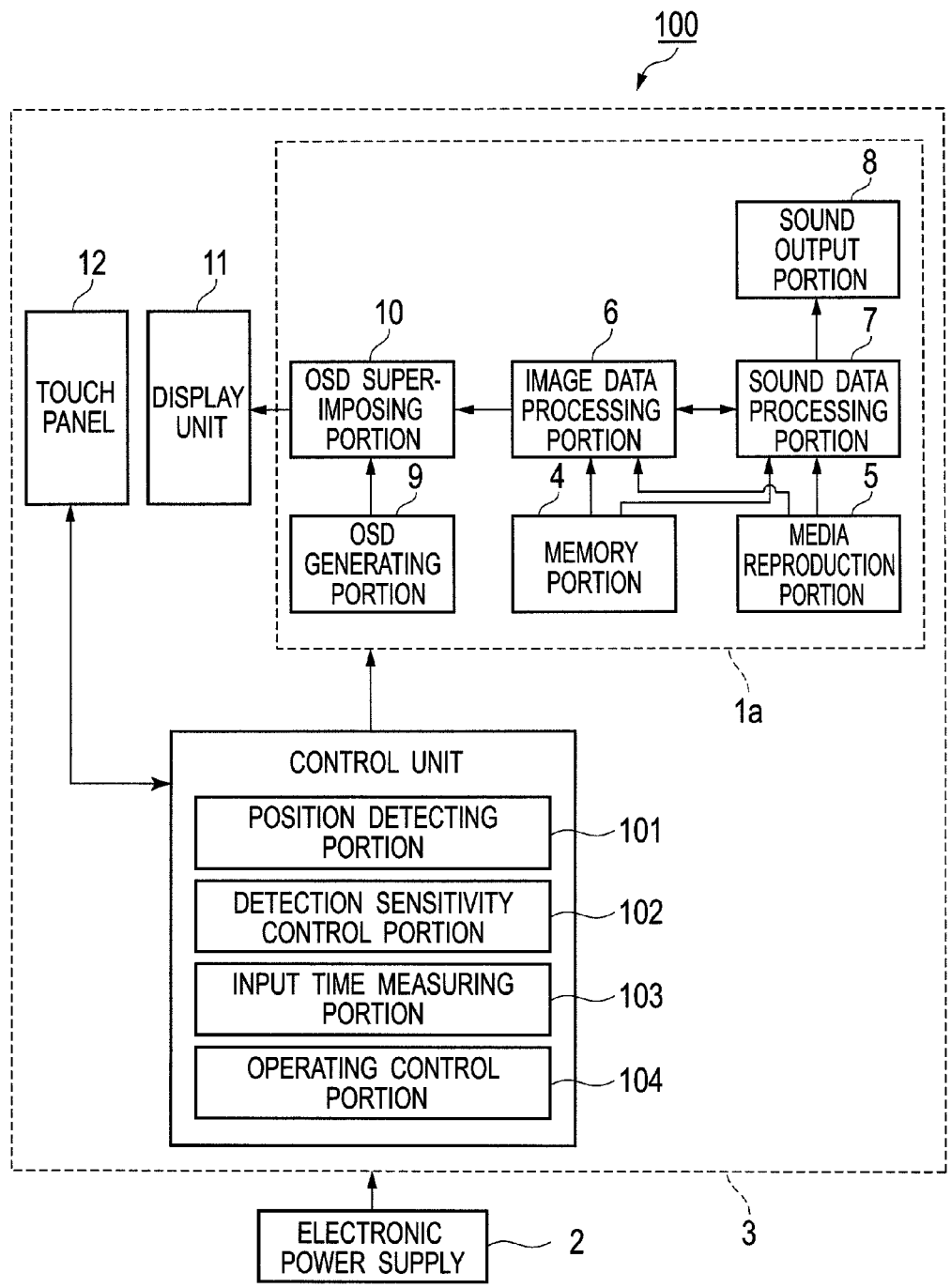
FIG. 1 is a block diagram that illustrates an electronic device according to each of exemplary embodiments of the present invention.

An electronic device 100 according to the first exemplary embodiment will be described with reference to FIG. 1. A controlled unit 1a includes a memory portion 4, a media reproduction portion 5, an image data processing portion 6, a sound data processing portion 7, a sound output portion 8, an on-screen display (OSD) generating portion 9 and an OSD superimposing portion 10.

Contents data is stored in the memory portion 4 or a medium to be reproduced by the media reproduction portion 5. For example, the contents data is movie data which includes image data and sound data therein. The image data and the sound data are synchronized with each other and are divided into plural chapters. It is noted that the contents data may be music data which includes only sound data therein.

For example, a hard disk drive (HDD) or a flash memory is employed as the memory portion 4, and an optical disk drive or a flash memory reproduction device which reproduces data stored in a detachable flash memory is employed as the media reproduction portion 5. It is noted that the memory portion 4 has a function for outputting data stored in the HDD or the flash memory. The electronic device 100 may omit the memory portion 4 or the media reproduction portion 5.

The memory portion 4 or the media reproduction portion 5 outputs image data included in the contents data according to control by an operating control portion 104 which will be described later. The memory portion 4 or the media reproduction portion 5 outputs sound data in synchronization with image data according to control by the operating control portion 104.

The image data processing portion 6 converts into an image signal (e.g., RGB signal) image data from the memory portion 4 or the media reproduction portion 5, and then outputs it.

The sound data processing portion 7 converts into a sound signal (e.g., analog sound signal) sound data from the memory portion 4 or the media reproduction portion 5, and then outputs the sound signal in synchronization with the image signal from the image data processing portion 6. The sound output portion 8 reproduces the sound signal from the sound data processing portion 7. It is noted that the operating control portion 104 adjusts a volume and a quality of sound from the sound output portion 8. For example, the sound output portion 8 has a speaker and an amplifier.

The operating control portion 104 controls the OSD generating portion 9 according to an operation and input by a user. The OSD generating portion 9 generates an OSD signal based on control by the operating control portion 104, and then outputs it. The OSD superimposing portion 10 superimposes an image based on the OSD signal upon an image based on the image signal from the image data processing portion 6, and then outputs the superimposed image signal. Then, a display unit 11 displays an image based on the superimposed image signal from the OSD superimposing portion 10. It is noted that if contents data is music data which includes only sound data, the OSD superimposing portion 10 outputs only an image signal based on the OSD signal and the display unit 11 displays the image based on the OSD signal from the OSD superimposing portion 10. An electronic power supply 2 supplies an electronic power to an electronic power supplied region 3.

As described the above, the memory portion 4, the media reproduction portion 5, the image data processing portion 6, the sound data processing portion 7, the sound output portion 8, the OSD generating portion 9 and the OSD superimposing portion 10 are controlled by the operating control portion 104 and make up the controlled unit 1a. In the present embodiment, although an image and sound reproduction means is cited as an example of the controlled unit 1a, the controlled unit 1a is not limited to it. The controlled unit 1a may be a mobile phone, a portable music player, a gaming machine, a navigation device, a personal computer or the like.

Next, a control unit 1 will be described below.

The control unit 1 includes a position detecting portion 101, a detection sensitivity control portion 102, an input time measuring portion 103 and the operating control portion 104. It is noted that a hypothetical plane situated away from an operation surface 12b of the touch panel 12 where an operation and input to the touch panel 12 is to be detected by a first distance d1 is called a close plane Cp, and a hypothetical plane situated away from the operation surface 12b by a second distance d2 is called a contact plane Tp. The contact plane Tp may be a position situated on the touch panel 12. This means that the contact plane Tp includes a plane in contact with the touch panel 12. The second distance d2 is smaller than the first distance d1.

Figure 3A:
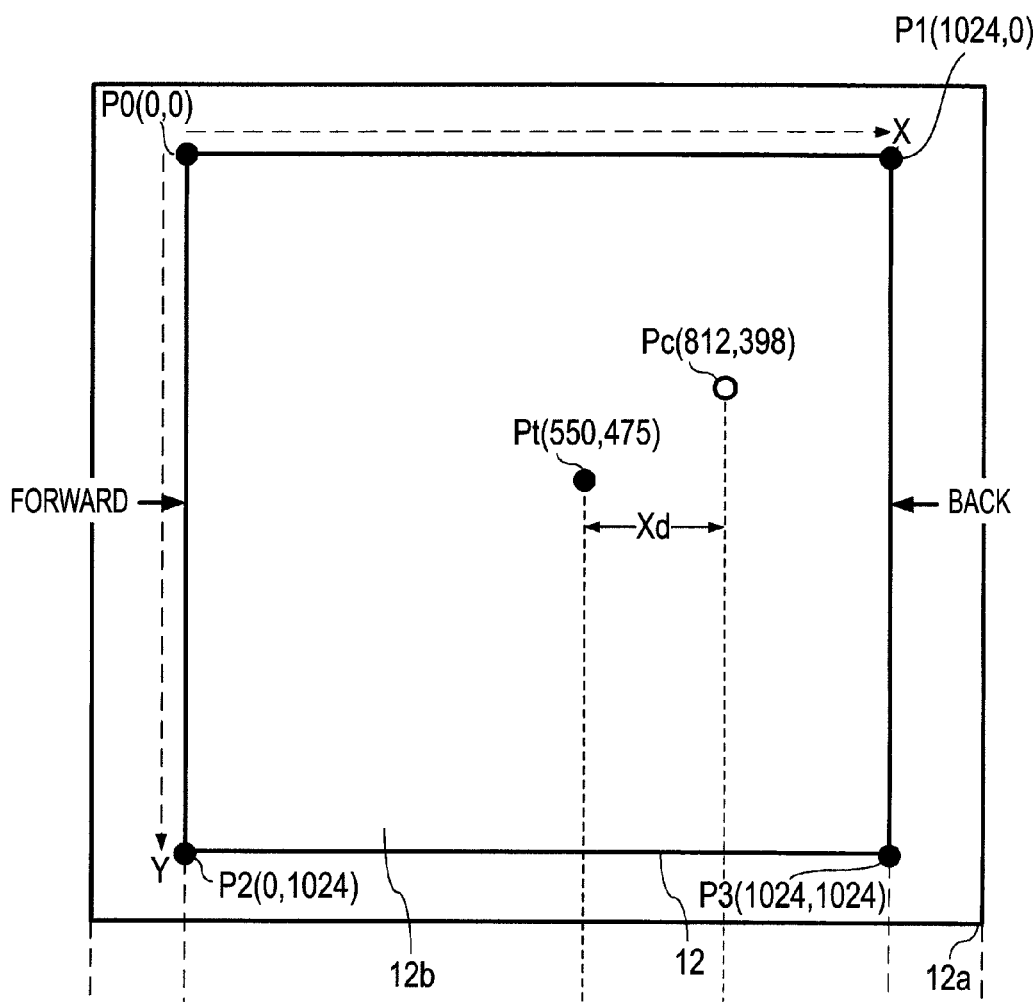
FIG. 3A is a schematic diagram that illustrates a detection method for detecting a direction of an operation and input according to a first exemplary embodiment of the present invention.
Figure 3B:
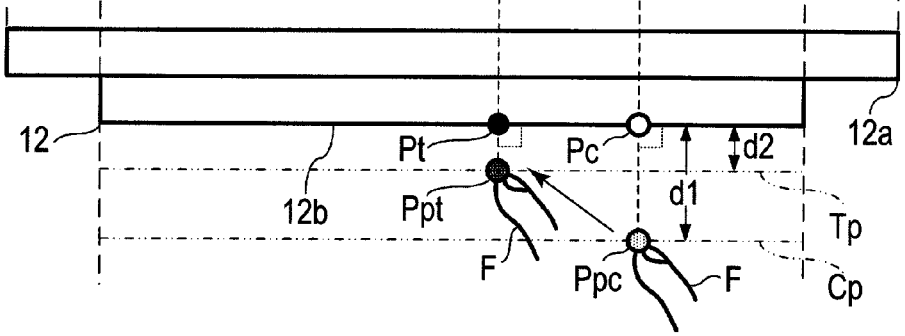
FIG. 3B is an overhead diagram that illustrates the detection method for detecting the direction of the operation and input according to the first exemplary embodiment of the present invention.

Firstly, an operation of the position detecting portion 101 will be described with reference to FIGS. 3A and 3B. FIG. 3A is a schematic diagram where the touch panel 12 is viewed from a front side thereof in a situation where the touch panel 12 is placed such that the operation surface 12b is perpendicular to a horizontal surface and an X axis is parallel to the horizontal surface. FIG. 3B is an overhead diagram where the touch panel 12 shown in FIG. 3A is viewed from above. It is noted that the close plane Cp and the contact plane Tp are drawn in a linear shape because FIG. 3B is the overhead diagram.

The position detecting portion 101 senses whether or not the pointing means F moves to a position Ppc on the close plane Cp from a position situated away from the touch panel 12 beyond the close plane Cp. If the position detecting portion 101 senses that the pointing means F moves to a position Ppc on the close plane Cp, the position detecting portion 101 detects a close coordinate Pc on the touch panel 12 based on the position Ppc on the close plane Cp. In this case, the close coordinate Pc on the touch panel 12b is a coordinate of a point at which a line that crosses the position Ppc and is perpendicular to the touch panel 12 crosses the touch panel 12. The description "the pointing means F moves to a position Ppc on the close plane Cp from a position situated away from the touch panel 12 beyond the close plane Cp" includes situations where the pointing means F stops on the close plane Cp and the pointing means F passes through the close plane Cp.

The position detecting portion 101 further senses whether or not the pointing means F moves to a position Ppt on the contact plane Tp from the position Ppc on the close plane Cp. If the position detecting portion 101 senses that the position means F moves to a position Ppt on the contact plane Tp, the position detecting portion 101 detects a contact coordinate Pt on the touch panel 12 based on the position Ppt on the contact plane Tp. In this case, the contact coordinate Pt on the touch panel 12 is a coordinate of a point at which a line that crosses the position Ppt and is perpendicular to the touch panel 12 crosses the touch panel 12, or a coordinate of a point at which the pointing means F contacts the touch panel 12. The description "the pointing means F moves to a position Ppt on the contact plane Tp from the position Ppc on the close plane Cp" includes situations where the pointing means F stops on the contact plane Tp and the pointing means F passes through the contact plane Tp.

If the position detecting portion 101 senses that the pointing means F moves to a position Ppc on the close plane Cp from a position situated away from the touch panel 12 beyond the close plane Cp, the input time measuring portion 103 starts time measurement. Then, if the position detecting portion 101 senses that the position means F moves to a position Ppt on the contact plane Tp from the position Ppc on the close plane Cp or a predetermined time elapses from a start time of the time measurement, the input time measuring portion 103 stops the time measurement.

The detection sensitivity control portion 102 controls detection sensitivity at a time when the position detecting portion 101 detects the pointing means F. More specifically, the detection sensitivity control portion 102 switches the detection sensitivity between close detection sensitivity and contact detection sensitivity.

The close detection sensitivity is sensitivity for allowing the position detecting portion 101 to sense whether or not the pointing means F moves to a position Ppc on the close plane Cp from a position situated away from the touch panel 12 beyond the close plane Cp. The contact detection sensitivity is sensitivity for allowing the position detecting portion 101 to sense whether or not the position means F moves to a position Ppt on the contact plane Tp from the position Ppc on the close plane Cp. Higher detection sensitivity allows the position detecting portion 101 to sense the pointing means F at a position situated farther away from the touch panel 12. This means that the close detection sensitivity is higher than the contact detection sensitivity.

In a case where the detection sensitivity of the touch panel 12 is the close detection sensitivity, if the position detecting portion 101 senses that the pointing means F moves to a position Ppc on the close plane Cp, the detection sensitivity control portion 102 changes the detection sensitivity from the close detection sensitivity to the contact detection sensitivity.

Figure 2:
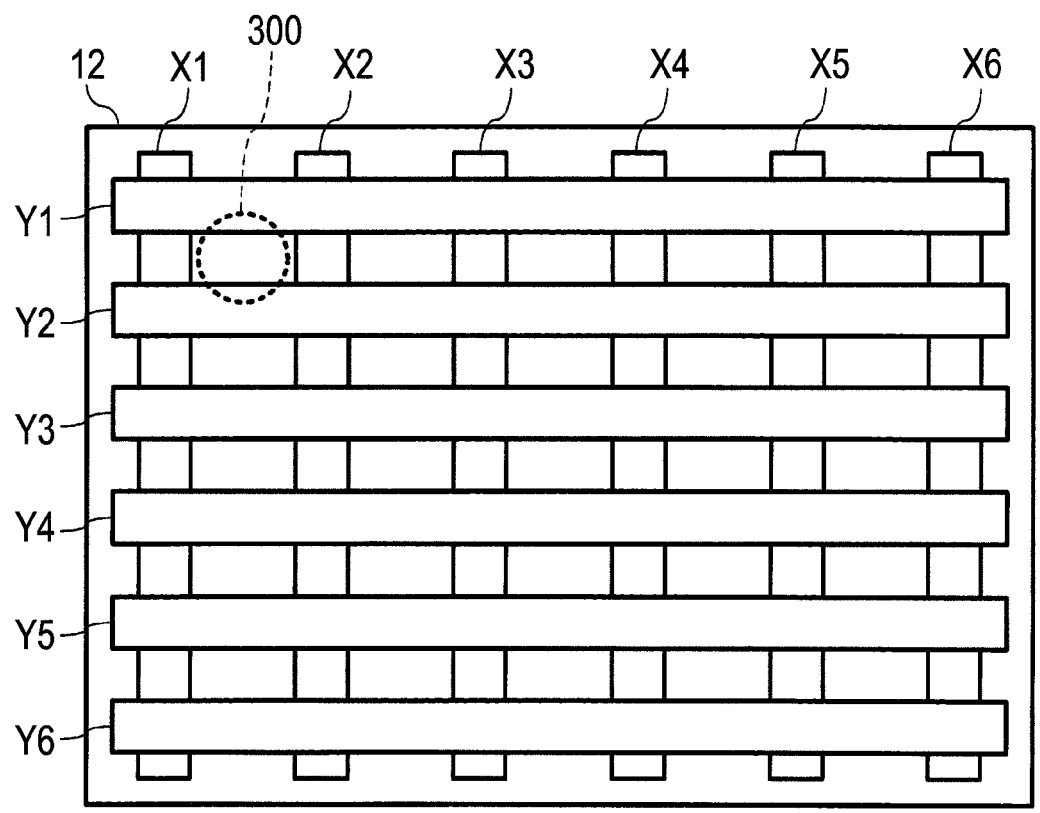
FIG. 2 is a schematic diagram that illustrates a touch panel according to each of the exemplary embodiments of the present invention.

Operations of the position detecting portion 101 and the detection sensitivity control portion 102 will be described in further detail with reference to a schematic diagram of the touch panel 12 shown in FIG. 2. FIG. 2 illustrates an example in which a touch panel with capacitances having electrodes arranged in a matrix is used as the touch panel 12.

As shown in FIG. 2, the touch panel 12 has X electrodes X1 to X6 and Y electrodes Y1 to Y6 which are arranged in a grid. Each capacitor composed of a pair of adjacent X electrodes is charged by the electronic power supply 2. Each capacitor composed of a pair of adjacent Y electrodes is also charged by the electronic power supply 2. Although as shown in FIG. 2, twelve electrodes are employed to facilitate understanding of a configuration of the touch panel 12, the number of electrodes is not limited to twelve. The number more than twelve of electrodes may be employed.

The position detecting portion 101 detects an amount of change of a capacitance value of each capacitor composed of a pair of adjacent electrodes at regular time intervals to detect a coordinate of a position where the pointing means F is located. For example, when the pointing means F is located at a position 300, an amount of change of a capacitance value of a capacitor composed of the X electrodes X1 and X2 is larger than an amount of change of a capacitance value of each capacitor composed of adjacent electrodes other than the X electrodes X1 and X2. Also, an amount of change of a capacitance value of a capacitor composed of the Y electrodes Y1 and Y2 is larger than an amount of change a capacitance value of each capacitor composed of adjacent electrodes other than the Y electrodes Y1 and Y2.

In a situation where the position detecting portion 101 is set to the close detection sensitivity, if an amount of change of a capacitance value of any of capacitors exceeds a predetermined threshold, the position detecting portion 101 determines that the pointing means F moves to a position Ppc on the close plane Cp from a position situated away from the touch panel 12 beyond the close plane Cp. When the position detecting portion 101 senses that the pointing means F moves to the position Ppc on the close plane Cp, the position detecting portion 101 detects a close coordinate Pc based on amounts of changes of capacitance values of all capacitors.

In a situation where the position detecting portion 101 is set to the contact detection sensitivity, if an amount of change of a capacitance value of any of capacitors exceeds a predetermined threshold, the position detecting portion 101 determines that the pointing means F moves to a position Ppt on the contact plane Tp from a position Ppc on the close plane Cp. When the position detecting portion 101 senses that the pointing means F moves to the position Ppt on the contact plane Tp, the position detecting portion 101 detects a contact coordinate Pt based on amounts of changes of capacitance values of all capacitors.

When the position detecting portion 101 detects an amount of change of a capacitance value of a capacitor composed of a pair of adjacent electrodes, the capacitor is discharged. Namely, as a time interval at which the position detecting portion 101 detects an amount of change of a capacitance value of each capacitor is lengthened, a charge time lengthens, which increases electronic charges to be accumulated in each capacitor.

As electronic charges to be accumulated in each capacitor increase, an amount of change of a capacitance value of any of capacitors at a time when the pointing means F comes close to the touch panel 12 becomes large, which allows the position detecting portion 101 to sense the pointing means F at a position situated away from the touch panel 12. Also, as electronic charges to be accumulated in each capacitor increases, the position detecting portion 101 can detect the close coordinate Pc or the contact coordinate Pt of the pointing means F even if the pointing means F is located at a position situated away from the touch panel 12. However, the time interval at which the position detecting portion 101 carries out detection is lengthened, which decreases the number of times the position detecting portion 101 carries out the detection per unit time. This deteriorates accuracy of detection of a coordinate on the touch panel 12.

In contrast, as a time interval at which the position detecting portion 101 detects an amount of change of a capacitance value of each capacitor is shortened, a charge time shortens, which decreases electronic charges to be accumulated in each capacitor. As electronic charges to be accumulated in each capacitor decreases, an amount of change of a capacitance value of any of capacitors at a time when the pointing means F comes close to the touch panel 12 becomes small. Therefore, if the pointing means F does not come closer to the touch panel 12 in comparison with the former case where the charge time lengthens, the position detecting portion 101 can not sense the pointing means F at a position situated away from the touch panel 12. However, the time interval at which the position detecting portion 101 carries out detection is shortened, which increases the number of times the position detecting portion 101 carries out the detection per unit time. This enhances accuracy of detection of a coordinate on the touch panel 12.

The detection sensitivity control portion 102 switches a time interval at which the position detecting portion 101 detects an amount of change of a capacitance value of each capacitor, which switches the detection sensitivity of the touch panel 12 between the close detection sensitivity and the contact detection sensitivity. Namely, the detection sensitivity control portion 102 switches the time interval at which the position detecting portion 101 carries out detection such that the time interval is shortened at a time when the detection sensitivity of the touch panel 12 is switched to the contact detection sensitivity.

Such a coordinate detection method of the position detecting portion 101 is cited as one example and various other methods may be used. Also, such a sensitivity control method of the detection sensitivity control portion 102 is cited as one example and various other methods may be used. For example, if a touch panel with a resistance film is used as the touch panel 12, the position detecting portion 101 detects a resistance value or a voltage value of the resistance film to detect a coordinate.

In this embodiment, the detection sensitivity control portion 102 controls a charge time, which controls an amount of change of a capacitance value of each capacitor, and switches the detection sensitivity. However, the detection sensitivity control portion 102 may switch the detection sensitivity by changing a threshold for sensing movement of the pointing means F. The touch panel 12 may be a touch panel capable of changing the detection sensitivity.

Next, a method for detecting a direction of an operation and input in the operating control portion 104 will be described with reference to FIGS. 3A and 4. FIG. 3A is a schematic diagram in which the touch panel 12 is viewed from the front side thereof in the situation where the touch panel 12 is placed such that the operation surface 12b is perpendicular to the horizontal surface and the X axis is parallel to the horizontal surface.

In FIG. 3A, the touch panel 12 is secured to a securing member 12a. As one example, the operation surface 12b where an operation and input to the touch panel 12 is to be detected is formed in a substantially square shape. The touch panel 12 is placed such that one side of the operation surface 12b is parallel to a horizontal direction. In the following description, words "top", "bottom", "left" and "right" respectively mean the top, the bottom, the left and the right of the touch panel 12 viewed from the front side thereof.

A line connecting a point P0 corresponding to the upper left corner of the operation surface 12b and a point P1 corresponding to the upper right corner of the operation surface 12b is set as the X axis when the touch panel 12 is viewed from the front side thereof. A zero point on the X axis is assigned to the point P0 and the right direction on the X axis is set as a positive direction. A line connecting the point P0 corresponding to the upper left corner of the operation surface 12b and a point P2 corresponding to the lower left corner of the operation surface 12b is set as a Y axis when the touch panel 12 is viewed from the front side thereof. A zero point on the Y axis is assigned to the point P0 and the downward direction on the Y axis is set as a positive direction. In FIG. 3A, the points P0, P1 and P2 and a point P3 corresponding to the lower right corner of the operation surface 12b have coordinates (0, 0), (1024, 0), (0, 1024) and (1024, 1024) on the X-Y plane. The close coordinate Pc and the contact coordinate Pt detected by the position detecting portion 101 have coordinates (812, 398) and (550, 475).

When the position detecting portion 101 detects the close coordinate Pc and then detects the contact coordinate Pt, the operating control portion 104 starts to detect a direction of an operation and input. In step S41 in FIG. 4, the operating control portion 104 obtains the close coordinate Pc and the contact coordinate Pt. In step S42, the operating control portion 104 calculates an X difference value Xd which is generated by subtracting an X coordinate value of the contact coordinate Pt from an X coordinate value of the close coordinate Pc. In the example of FIG. 3A, the operating control portion 104 subtracts an X coordinate value "550" of the contact coordinate Pt from an X coordinate value "812" of the close coordinate Pc to obtain an X difference value Xd "262".

In step S43, the operating control portion 104 determines whether or not the X difference value Xd is equal to or more than zero. If the X difference value Xd is equal to or more than zero (Yes), the operating control portion 104 determines that an operation and input is carried out in a direction from the right to the left of the operation surface 12b when the touch panel 12 is viewed from the front side thereof (step S44). If the X difference value Xd is less than zero (No), the operating control portion 104 determines that an operation and input is carried out in a direction from the left to the right of the operation surface 12b when the touch panel 12 is viewed from the front side thereof (step S45).

In step S43, if the X difference value Xd is zero, the operating control portion 104 determines that an operation and input is carried out in a direction from the right to the left of the operation surface 12b. The determination is not limited to it. For example, the X difference value Xd is zero, the operating control portion 104 determines that a direction of an operation and input is not detected and then controls the controlled unit 1a such that an OSD image which indicates that a direction of an operation and input is not detected is display on the display unit 11.

After the operating control portion 104 determines a direction of an operation and input, the operating control portion 104 controls the controlled unit 1a based on the determination result regarding a direction of an operation and input. For example, if the operating control portion 104 determines that an operation and input is carried out in a direction from the right to the left of the operation surface 12b, the operating control portion 104 controls the controlled unit 1a such that the controlled unit 1a returns the present chapter to an anterior chapter by one chapter and reproduces contents data from a head portion of the anterior chapter. Also, if the operating control portion 104 determines that an operation and input is carried out in a direction from the left to the right of the operation surface 12b, the operating control portion 104 controls the controlled unit 1a such that the controlled unit 1a forwards the present chapter to a posterior chapter by one chapter and reproduces contents data from a head portion of the posterior chapter. It is preferable to indicate on the right side of the securing member 12a the operation of the controlled unit 1a at the time when the operating control portion 104 determines that an operation and input is carried out in a direction from the right to the left of the operation surface 12b, and indicate on the left side of the securing member 12a the operation of the controlled unit 1a at the time when the operating control portion 104 determines that an operation and input is carried out in a direction from the left to the right of the operation surface 12b.

As described the above, the operating control portion 104 controls the controlled unit 1a such that the controlled unit 1a carries out a different operation according to a direction of an operation and input. The electric device 100 allows the controlled unit 1a to carry out a different operation according to a situation before the pointing means F touches the touch panel 12.

Figure 5:
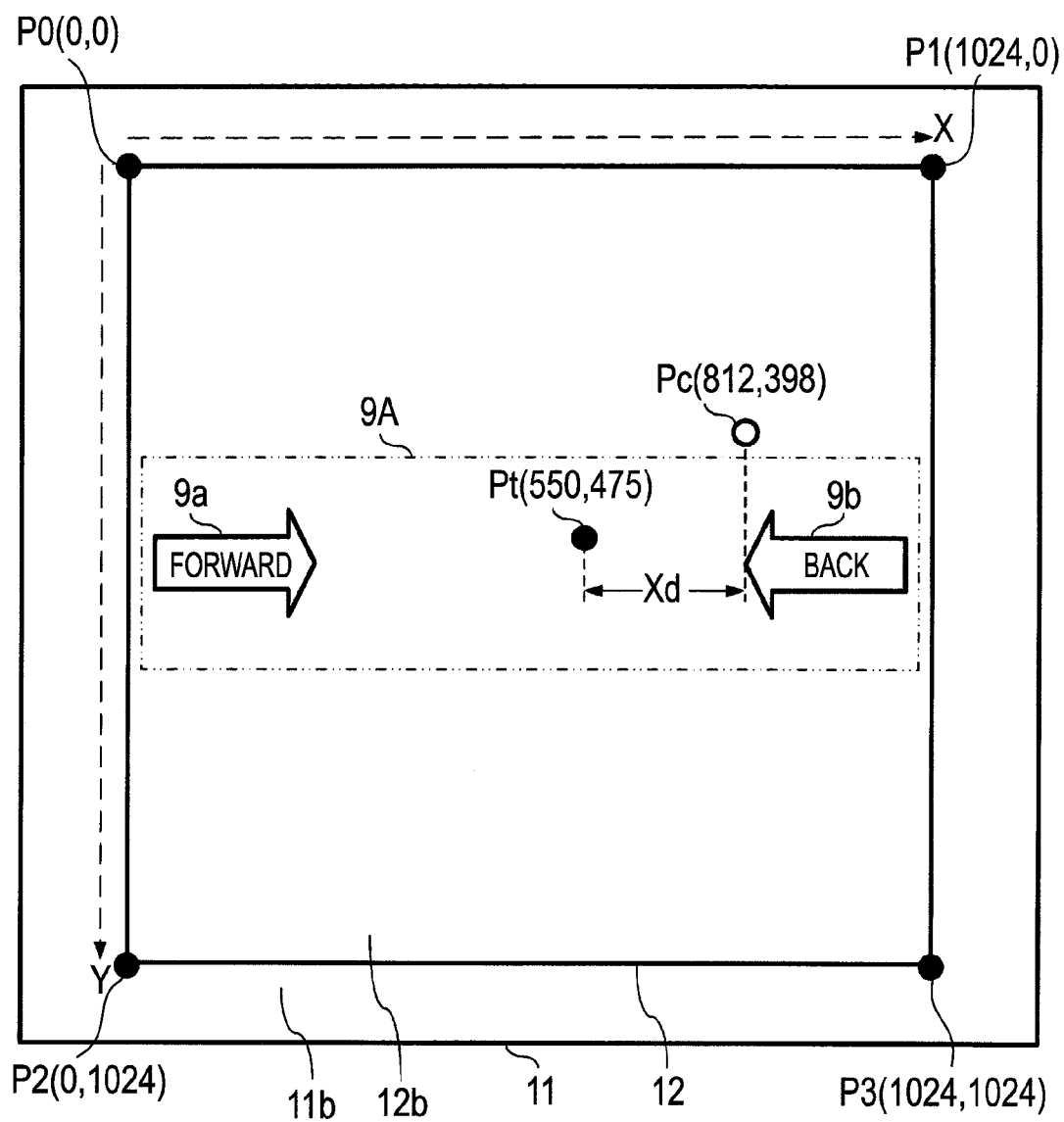
FIG. 5 is a schematic diagram that illustrates the detection method for detecting the direction of the operation and input according to the first exemplary embodiment of the present invention.

As shown in FIG. 5, the touch panel 12 may overlap with the display unit 11 such that the operation surface 12b where an operation and input to the touch panel 12 is to be detected is parallel to a display surface 11b of the display unit 11 where an image is to be displayed. In this case, it is preferable that the operating control portion 104 controls the controlled unit 1a such that an image including an OSD 9a which indicates an operation of the controlled unit 1a at a time when the operating control portion 104 determines that an operation and input is carried out in a direction from the left to the right of the operation surface 12b is displayed on the display unit 11, and the image further including an OSD 9b which indicates an operation of the controlled unit 1a at a time when the operating control portion 104 determines that an operation and input is carried out in a direction from the right to the left of the operation surface 12b is displayed on the display unit 11. Thus, by displaying the image including the OSDs 9a and 9b on the display unit 11, the operating control portion 104 provides a user with the operation of the controlled unit 1a at the time when the operating control portion 104 determines that an operation and input is carried out in a direction from the left to the right of the operation surface 12b and the operation of the controlled unit 1a at the time when the operating control portion 104 determines that an operation and input is carried out in a direction from the right to the left of the operation surface 12b.

If the enter region of operation surface 12b of the touch panel 12 is set as one region, a function at a time when the operating control portion 104 determines that an operation and input is carried out in a direction from the left to the right of the operation surface 12b and a function at a time when the operating control portion 104 determines that an operation and input is carried out in a direction from the right to the left of the operation surface 12b may be assigned to the enter region of operation surface 12b or apart 9A of the enter region of operation surface 12b.

The operating control portion 104 may control the controlled unit 1a such that after the position detecting portion 101 detects the contact coordinate Pt, a different OSD image is displayed depending on determination by the operating control portion 104 that an operation and input is carried out in a direction from the left to the right or from the right to the left of the operation surface 12b.

Figure 6:
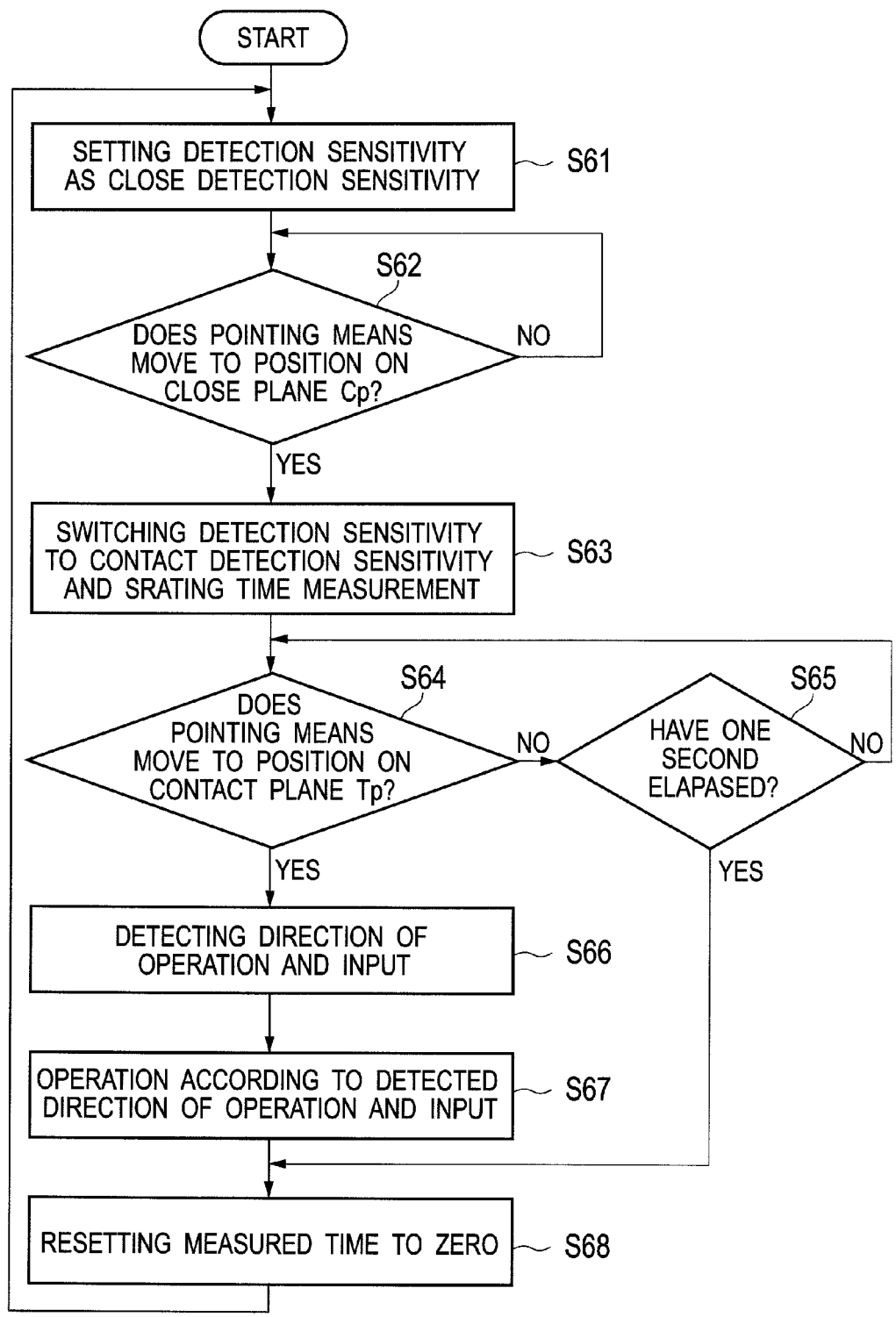
FIG. 6 is a flow chart that illustrates an operation of a control unit according to each of the exemplary embodiments of the present invention.

Next, an operating control method of the electric device 100 will be described below in detail with reference to FIG. 6 while focusing on an operation of the control unit 1.

For example, when the electric power supply 2 of the electric device 100 is turned on, the control unit 1 starts the operating control method. In step S61, the detection sensitivity control portion 102 sets detection sensitivity at a time when the position detecting portion 101 detects a coordinate of the pointing means F as the close detection sensitivity. The position detecting portion 101 starts an operation to sense the pointing means F in the close detection sensitivity. It is noted that if the detection sensitivity has been set as the close detection sensitivity, the detection sensitivity control portion 102 remains a state where the detection sensitivity has been set as the close detection sensitivity.

In step S62, the position detecting portion 101 determines whether or not the pointing means F moves to a position on the close plane Cp. If the pointing means F does not move to a position on the close plane Cp (No), the flowchart is returned to step S62. If the pointing means F moves to a position on the close plane Cp (Yes), the position detecting portion 101 detects the close coordinate Pc and the flowchart proceeds to step S63.

In step S63, the detection sensitivity control portion 102 switches the detection sensitivity from the close detection sensitivity to the contact detection sensitivity, and the input time measuring portion 103 starts time measurement.

In step S64, the position detecting portion 101 determines whether or not the pointing means F moves to a position on the contact plane Tp. If the pointing means F does not move to a position on the contact plane Tp (No), the flowchart proceeds to step S65. If the pointing means F moves to a position on the contact plane Tp (Yes), the position detecting portion 101 detects the contact coordinate Pt and the flowchart proceeds to step S66.

In step S65, the input time measuring portion 103 determines whether or not a predetermined time since the position detecting portion 101 senses that the pointing means F moves to a position on the close plane Cp has elapsed. In the present embodiment, as one example, the input time measuring portion 103 determines whether or not one second has elapsed. If one second has not elapsed, the flowchart returns to step S64. If one second has elapsed, the flowchart proceeds to step S68. In step S68, the input time measuring portion 103 resets the measured time to zero and the flowchart returned to step S61.

Then, in step S61, the detection sensitivity control portion 102 switches the detection sensitivity to the close detection sensitivity. Thus, when the predetermined time since the position detecting portion 101 senses that the pointing means F moves to a position on the close plane Cp has elapsed, the detection sensitivity is switched to the close detection sensitivity. This prevents malfunction at a time when a user involuntarily moves the pointing means F toward the touch panel 12.

Figure 4:
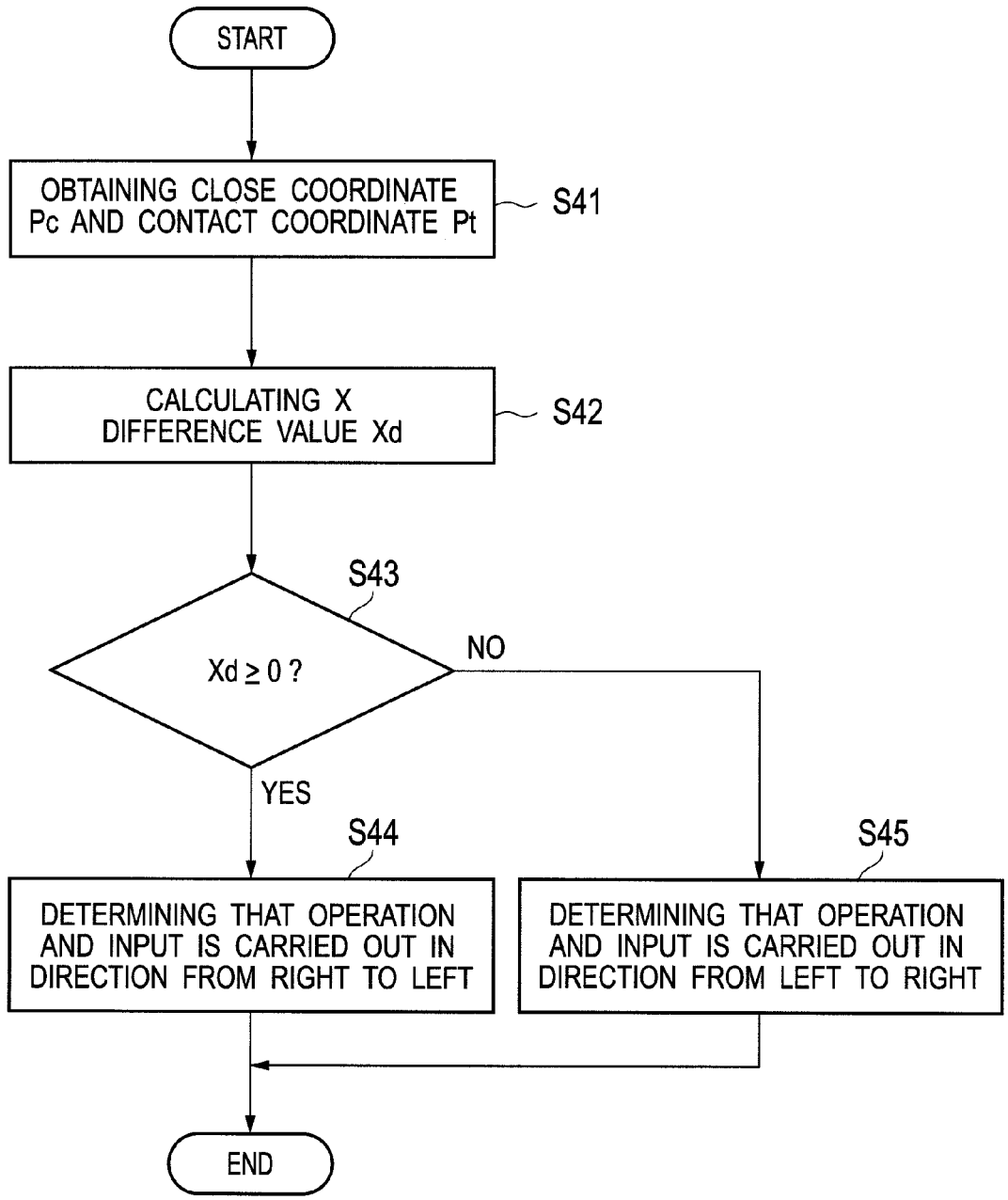
FIG. 4 is a flowchart that illustrates the detection method for detecting the direction of the operation and input according to the first exemplary embodiment of the present invention.

On the other hand, when the position detecting portion 101 senses that the pointing means F moves to a position on the contact plane Tp (Yes in step S64), the operating control portion 104 detects a direction of an operation and input based on the close coordinate Pc and the contact coordinate Pt detected by the position detecting portion 101 according to the flowchart in FIG. 4 (step S66). In step S67, the operating control portion 104 controls the controlled unit 1a such that the controlled unit 1a carries out an operation according to the detected direction of an operation and input. In step S68, the input time measuring portion 103 resets the measured time to zero, and then the flowchart is returned to step S61. Thus, the operating control portion 104 controls an operation of the controlled unit 1a based on the close coordinate Pc and the contact coordinate Pt.

Although the operating control portion 104 calculates the X difference value Xd, the operating control portion 104 may calculate a Y difference value Yd which is generated by subtracting a Y coordinate value of the contact coordinate Pt from a Y coordinate value of the close coordinate Pc, and determine whether an operation and input is carried out in a direction from the top to the bottom or from the bottom to the top of the operation surface 12b when the touch panel 12 is viewed from the front side thereof. In this case, the operating control portion 104 controls the controlled unit 1a according to the determination that an operation and input is carried out in a direction from the top to the bottom or from the bottom to the top of the operation surface 12b. In the example of FIG. 3A, the operating control portion 104 subtracts a Y coordinate value "475" of the contact coordinate Pt from a Y coordinate value "398" of the close coordinate Pc to obtain a Y difference value Yd "−77".

If the Y difference value Yd is equal to or more than zero, the operating control portion 104 determines that an operation and input is carried out in a direction from the bottom to the top of the operation surface 12b when the touch panel 12 is viewed from the front side thereof. If the Y difference value Yd is less than zero, the operating control portion 104 determines that an operation and input is carried out in a direction from the top to the bottom of the operation surface 12b when the touch panel 12 is viewed from the front side thereof. When the operating control portion 104 calculates a Y difference value Yd, the position detecting portion 101 may detect only Y coordinate values of the close coordinate Pc and the contact coordinate Pt. Also, when the operating control portion 104 calculates an X difference value Xd, the position detecting portion 101 may detect only X coordinate values of the close coordinate Pc and the contact coordinate Pt.

As described the above, the operating control portion 104 detects a direction of an operation and input and controls the controlled unit 1a such that the controlled unit 1a carries out a different operation according to the detection result. Thus, the electric device 100 allows the controlled unit 1a to carry out a different operation according to a situation before the pointing means F touches the touch panel 12. Further, when plural functions are assigned to a certain region of the touch panel 12, it is not necessary to divide the certain region of the touch panel 12 into plural parts each to which a different function is assigned. This allows a user to carry out an operation and input with respect to a wider region. As a result, it is possible to provide the user-friendly electric device and operating control method.

(Second Exemplary Embodiment)

Figure 7:
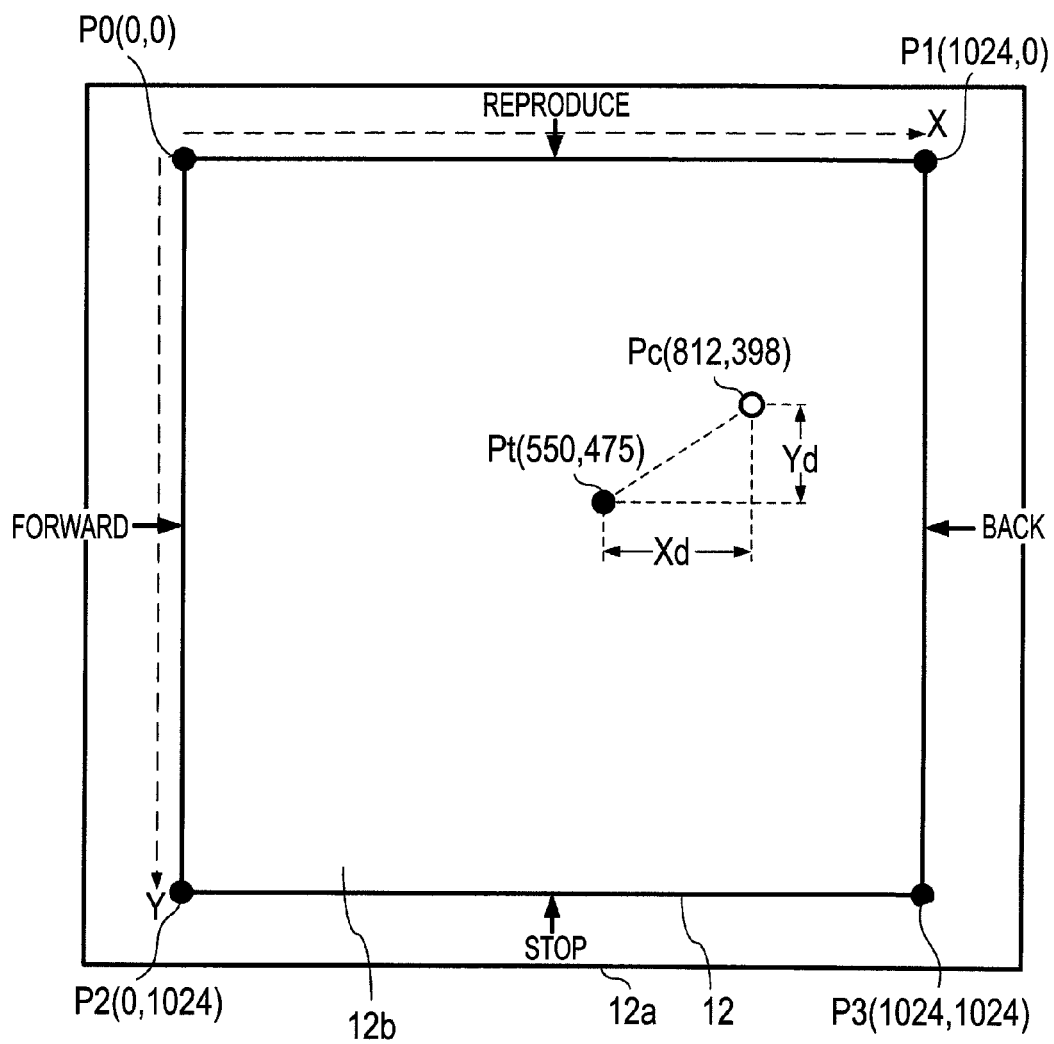
FIG. 7 is a schematic diagram that illustrates a detection method for detecting a direction of an operation and input according to a second exemplary embodiment of the present invention.

An operation of the operating control portion 104 will be described with reference to FIGS. 7 and 8. FIG. 7 is a schematic diagram in which the touch panel 12 is viewed from the front side thereof in the situation where the touch panel is placed such that the operation surface 12b is perpendicular to the horizontal surface and the X axis is parallel to the horizontal surface. The present embodiment is the same as the first exemplary embodiment, with the exception of a method for detecting a direction of an operation and input carried out by the operating control portion 104. More specifically, a method for detecting a direction of an operation and input of the present embodiment differs from the method of the first exemplary embodiment in step S66 of FIG. 6. Definitions of words "top", "bottom", "left", "right", "X axis" and "Y axis" and a situation where the touch panel 12 is placed and the like are the same as the first exemplary embodiment.

When the position detecting portion 101 detects the close coordinate Pc and then detects the contact coordinate Pt as shown in FIG. 7, the operating control portion 104 starts to detect a direction of an operation and input.

Figure 8:
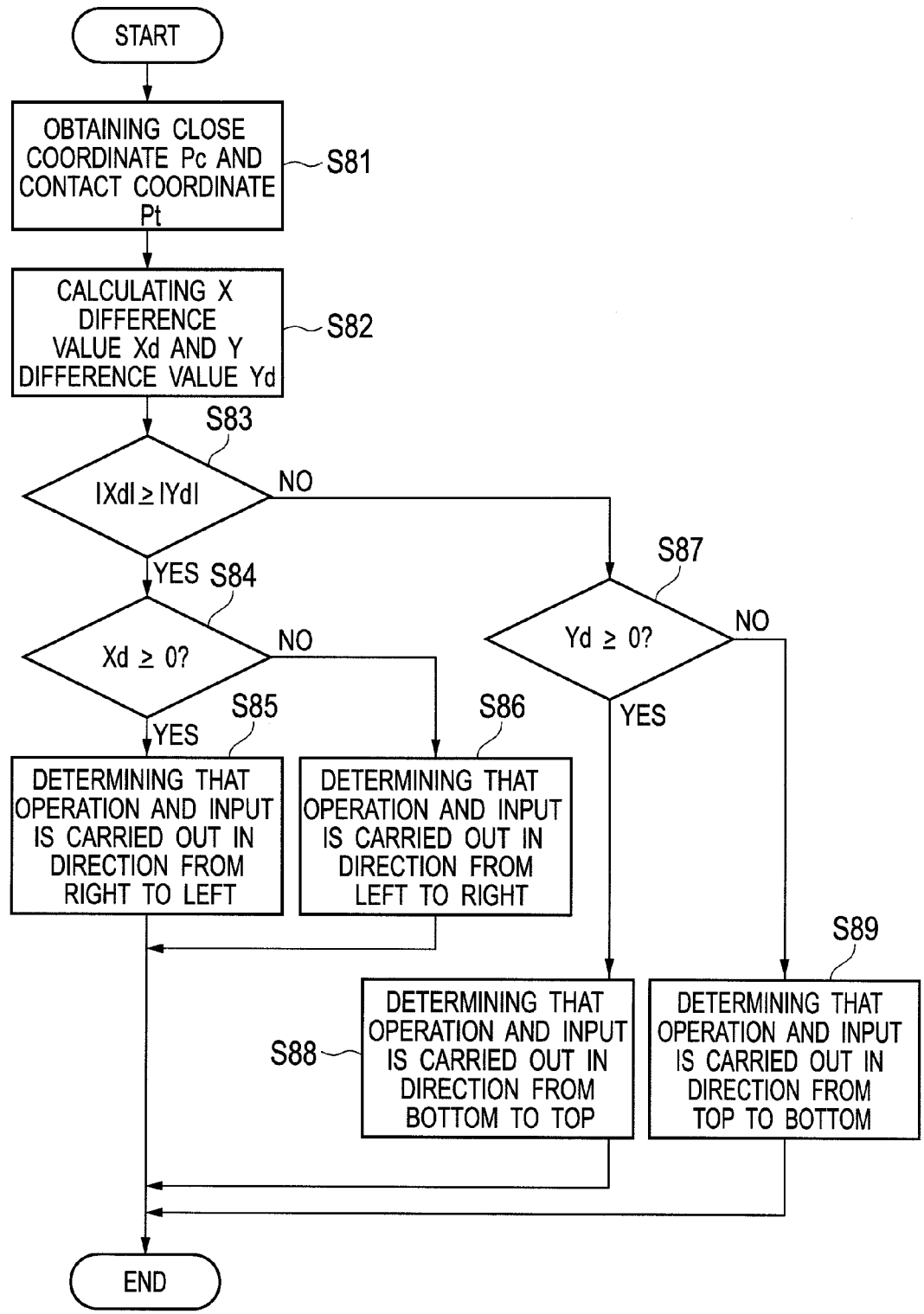
FIG. 8 is a flow chart that illustrates the detection method for detecting the direction of the operation and input according to the second exemplary embodiment of the present invention.

In step S81 in FIG. 8, the operating control portion 104 obtains the close coordinate Pc and the contact coordinate Pt. In step S82, the operating control portion 104 calculates an X difference value Xd which is generated by subtracting an X coordinate value of the contact coordinate Pt from an X coordinate value of the close coordinate Pc, and a Y difference value Yd which is generated by subtracting a Y coordinate value of the contact coordinate Pt from a Y coordinate value of the close coordinate Pc. In the example of FIG. 7, the operating control portion 104 subtracts an X coordinate value "550" of the contact coordinate Pt from an X coordinate value "812" of the close coordinate Pc to obtain an X difference value Xd "262". Also, the operating control portion 104 subtracts a Y coordinate value "475" of the contact coordinate Pt from a Y coordinate value "398" of the close coordinate Pc to obtain a Y difference value Yd "−77".

In step S83, the operating control portion 104 compares an absolute value of the X difference value Xd with an absolute value of the Y difference value Yd. In step S83, the operating control portion 104 determines that the absolute value of the X difference value Xd is equal to or more than the absolute value of the Y difference value Yd (Yes), the flowchart proceeds to step S84. In step S83, the operating control portion 104 determines that the absolute value of the X difference value Xd is less than the absolute value of the Y difference value Yd (No), the flowchart proceeds to step S87.

In step S84, the operating control portion 104 determines whether or not the X difference value Xd is equal to or more than zero. If the X difference value Xd is equal to or more than zero (Yes), the operating control portion 104 determines that an operation and input is carried out in a direction from the right to the left of the operation surface 12b when the touch panel 12 is viewed from the front side thereof (step S85). If the X difference value Xd is less than zero (No), the operating control portion 104 determines that an operation and input is carried out in a direction from the left to the right of the operation surface 12b when the touch panel 12 is viewed from the front side thereof (step S86).

In step S87, the operating control portion 104 determines whether or not the Y difference value Yd is equal to or more than zero. If the Y difference value Yd is equal to or more than zero (Yes), the operating control portion 104 determines that an operation and input is carried out in a direction from the bottom to the top of the operation surface 12b when the touch panel 12 is viewed from the front side thereof (step S88). If the Y difference value Yd is less than zero (No), the operating control portion 104 determines that an operation and input is carried out in a direction from the top to the bottom of the operation surface 12b when the touch panel 12 is viewed from the front side thereof (step S89).

In steps S83, if the absolute value of the X difference value Xd is equal to the absolute value of the Y difference value Yd, the operating control portion 104 may determine that a direction of an operation and input is not detected and control the controlled unit 1a such that an OSD image which indicates that a direction of an operation and input is not detected is displayed on the display unit 11. In step S84, if the X difference value Xd is zero, the operating control portion 104 may determine that a direction of an operation and input is not detected and then control the controlled unit 1a such that an OSD image which indicates that a direction of an operation and input is not detected is displayed on the display unit 11. In step S87, if the Y difference value Yd is zero, the operating control portion 104 may determine that a direction of an operation and input is not detected and then control the controlled unit 1a such that an OSD image which indicates that a direction of an operation and input is not detected is displayed on the display unit 11.

The operating control portion 104 controls the controlled unit 1a based on the determination result regarding a direction of an operation and input. For example, if the operating control portion 104 determines that an operation and input is carried out in a direction from the right to the left of the operation surface 12b, the operating control portion 104 controls the controlled unit 1a such that the controlled unit 1a returns the present chapter to an anterior chapter by one chapter and reproduces contents data from a head portion of the anterior chapter. Also, if the operating control portion 104 determines that an operation and input is carried out in a direction from the left to the right of the operation surface 12b, the operating control portion 104 controls the controlled unit 1a such that the controlled unit 1a forwards the present chapter to a posterior chapter by one chapter and reproduces contents data from a head portion of the posterior chapter.

Further, if the operating control portion 104 determines that an operation and input is carried out in a direction from the bottom to the top of the operation surface 12b, the operating control portion 104 controls the controlled unit 1a such that the controlled unit 1a stops to reproduce contents data. If the controlled unit 1a does not reproduce contents data, the operating control portion 104 controls the controlled unit 1a such that the controlled unit 1a keeps the situation where the controlled unit 1a does not carry out reproduction. Also, if the operating control portion 104 determines that an operation and input is carried out in a direction from the top to the bottom of the operation surface 12b, the operating control portion 104 controls the controlled unit 1a such that the controlled unit 1a starts to reproduce contents data. If the controlled unit 1a has always started to reproduce contents data, the operating control portion 104 controls the controlled unit 1a such that the controlled unit 1a keeps the situation where the controlled unit 1a reproduces the contents data.

As described the above, the operating control portion 104 compares an absolute value of an X difference value Xd with an absolute value of a Y difference value Yd, selects either the X difference value Xd or the Y difference value Yd based on the comparison result, and controls the controlled unit 1a based on the selected difference value.

It is preferable to indicate on the right side of the securing member 12a the operation of the controlled unit 1a at the time when the operating control portion 104 determines that an operation and input is carried out in a direction from the right to the left of the operation surface 12b, indicate on the left side of the securing member 12a the operation of the controlled unit 1a at the time when the operating control portion 104 determines that an operation and input is carried out in a direction from the left to the right of the operation surface 12b, indicate on the bottom side of the securing member 12a the operation of the controlled unit 1a at the time when the operating control portion 104 determines that an operation and input is carried out in a direction from the bottom to the top of the operation surface 12b, and indicate on the top side of the securing member 12a the operation of the controlled unit 1a at the time when the operating control portion 104 determines that an operation and input is carried out in a direction from the top to the bottom of the operation surface 12b.

As well as the first exemplary embodiment, as shown in FIG. 5, the touch panel 12 may overlap with the display unit 11 such that the operation surface 12b where an operation and input to the touch panel 12 is to be detected is parallel to the display surface 11b of the display unit 11 where an image is to be displayed. Under this configuration, by displaying the image including OSDs on the display unit 11, the operating control portion 104 provides a user with the operation of the controlled unit 1a at the time when the operating control portion 104 determines that an operation and input is carried out in a direction from the left to the right of the operation surface 12b, the operation of the controlled unit 1a at the time when the operating control portion 104 determines that an operation and input is carried out in a direction from the right to the left of the operation surface 12b, the operation of the controlled unit 1a at the time when the operating control portion 104 determines that an operation and input is carried out in a direction from the bottom to the top of the operation surface 12b, and the operation of the controlled unit 1a at the time when the operating control portion 104 determines that an operation and input is carried out in a direction from the top to the bottom of the operation surface 12b.

If the enter region of operation surface 12b of the touch panel 12 is set as one region, a function at a time when the operating control portion 104 determines that an operation and input is carried out in a direction from the left to the right of the operation surface 12b, a function at a time when the operating control portion 104 determines that an operation and input is carried out in a direction from the right to the left of the operation surface 12b, a function at a time when the operating control portion 104 determines that an operation and input is carried out in a direction from the bottom to the top of the operation surface 12b, and a function at a time when the operating control portion 104 determines that an operation and input is carried out in a direction from the top to the bottom of the operation surface 12b may be assigned to the enter region of operation surface 12b or a part 9A of the enter region of operation surface 12b (see FIG. 5).

As described the above, the operating control portion 104 detects a direction of an operation and input from among four directions of an operation and input, and controls the controlled unit 1a such that the controlled unit 1a carries out a different operation according to the detection result. The electric device 100 allows the controlled unit 1a to carry out a different operation according to a situation before the pointing means F touches the touch panel 12.

Further, when plural functions are assigned to a certain region of the touch panel 12, it is not necessary to divide the certain region of the touch panel 12 into plural parts each to which a different function is assigned. This allows a user to carry out an operation and input with respect to a wider region. As a result, it is possible to provide the user-friendly electric device and operating control method.

(Third Exemplary Embodiment)

Figure 9:
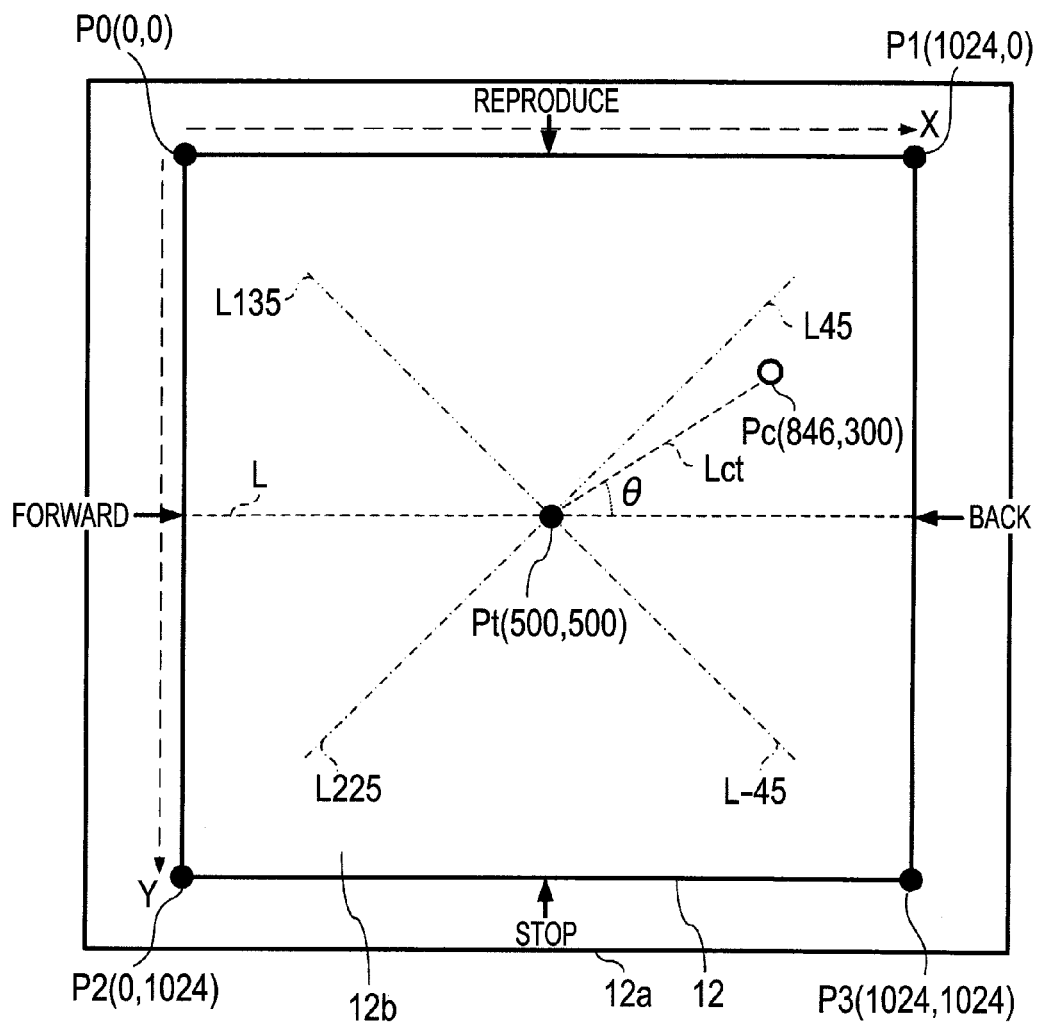
FIG. 9 is a schematic diagram that illustrates a detection method for detecting a direction of an operation and input according to a third exemplary embodiment of the present invention.

An operation of the operating control portion 104 will be described with reference to FIGS. 9 and 10. FIG. 9 is a schematic diagram in which the touch panel 12 is viewed from the front side thereof in the situation where the touch panel is placed such that the operation surface 12b is perpendicular to the horizontal surface and the X axis is parallel to the horizontal surface. The present embodiment is the same as the first exemplary embodiment, with the exception of a method for detecting a direction of an operation and input carried out by the operating control portion 104. More specifically, a method for detecting a direction of an operation and input of the present embodiment differs from the method of the first exemplary embodiment in step S66 of FIG. 6. Definitions of words "top", "bottom", "left", "right", "X axis" and "Y axis" and a situation where the touch panel 12 is placed and the like are the same as the first exemplary embodiment.

As one example, a line L which is parallel to the X axis and passes a point indicated by a contact coordinate Pt on the operation surface 12b is set as a reference line to be used to define an angle. As will be described later, since the line L is set as the reference line, it is easy to calculate an angle. The present embodiment is however not limited to it.

An anti-clockwise direction on the touch panel 12 viewed from the front side thereof is set as a positive direction. A line Lct in FIG. 9 is defined as a line connecting a point indicated by a close coordinate Pc on the operation surface 12b to a point indicated by the contact coordinate Pt on the operation surface 12b. A line L45 is defined as a line at 45 degrees to the line L. A line L135 is defined as a line at 135 degrees to the line L. A line L225 is defined as a line at 225 degrees to the line L. A line L-45 is defined as a line at −45 degrees to the line L. It is noted that −45 degrees is the same angle as 315 degrees.

When the position detecting portion 101 detects the close coordinate Pc and then detects the contact coordinate Pt as shown in FIG. 9, the operating control portion 104 starts to detect a direction of an operation and input.

Figure 10:
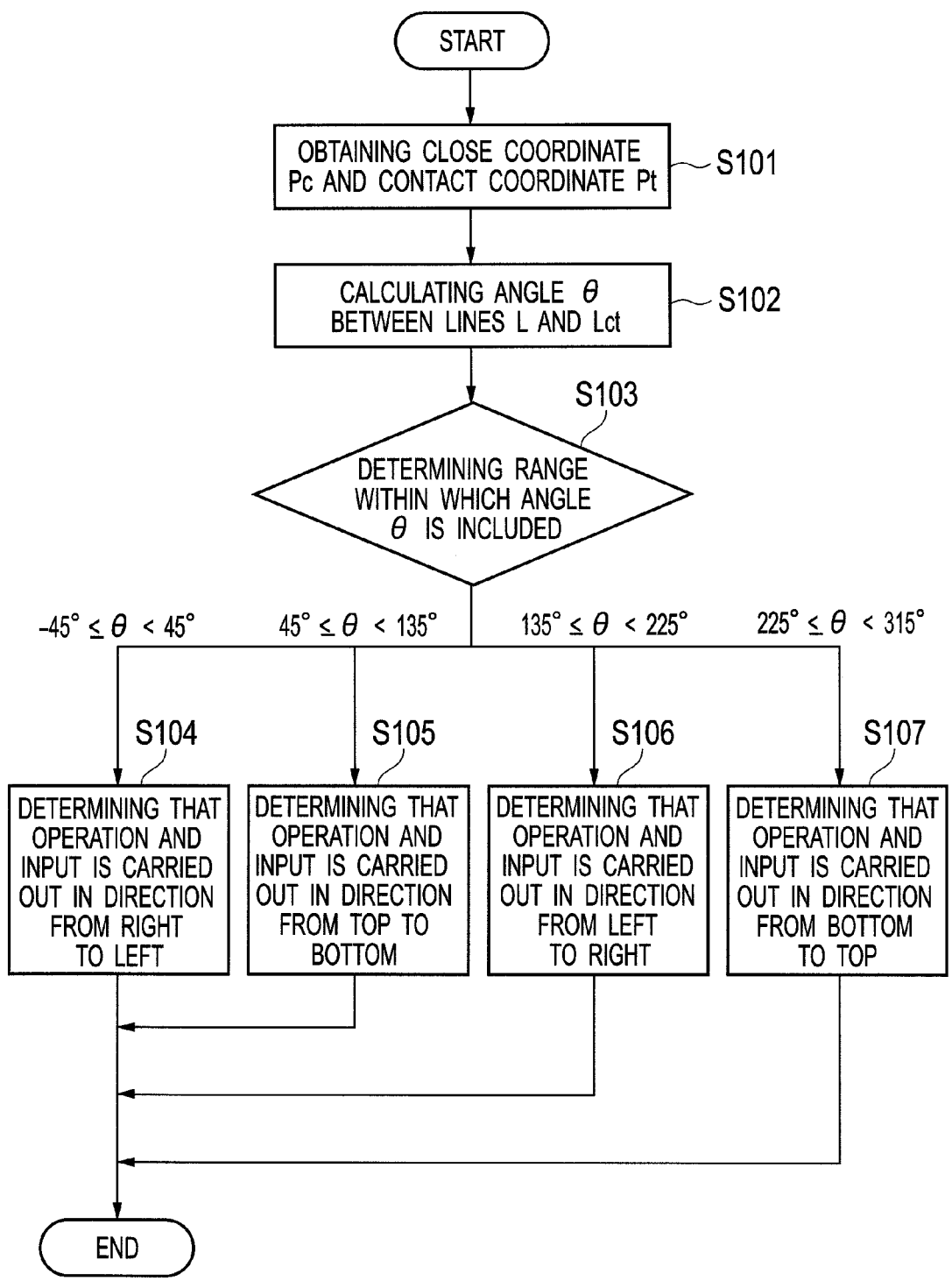
FIG. 10 is a flow chart that illustrates the detection method for detecting the direction of the operation and input according to the third exemplary embodiment of the present invention.

In step S101 in FIG. 10, the operating control portion 104 obtains the close coordinate Pc and the contact coordinate Pt. In step S102, the operating control portion 104 calculates an angle θ between the line L and the line Lct based on the close coordinate Pc and the contact coordinate Pt. More specifically, the operating control portion 104 calculates a difference value which is generated by subtracting an X coordinate value of a cross point at the intersection of the line L with the line Lct from an X coordinate value of the close coordinate Pc, and a difference value which is generated by subtracting a Y coordinate value of the cross point at the intersection of the line L with the line Lct from a Y coordinate value of the close coordinate Pc. Then, the operating control portion 104 calculates an angle θ between the line L and the line Lct using cosine and sine theorems based on these difference values. In the present embodiment, the angle θ is 30 degrees. It is noted that a coordinate of the cross point at the intersection of the line L with the line Lct is the contact coordinate Pt because the line cross the contact coordinate Pt.

In step S103, the operating control portion 104 determines a range within which the angle θ is included among a range from −45 degrees to 45 degrees (−45°≦θ<45°), a range from 45 degrees to 135 degrees (45°≦θ<135°), a range from 135 degrees to 225 degrees (135°≦θ≦225°), and a range from 225 degrees to 315 degrees (225°≦θ<315°). It is noted that the range from −45 degrees to 45 degrees is the same as a total range including a range from 315 degrees to 360 degrees (315°≦θ<360°) and a range from 0 degree to 45 degrees (0°≦θ<45°).

In a case where the angle θ is included in the range from −45 degrees to 45 degrees (−45°≦θ<45°), the operating control portion 104 determines that an operation and input is carried out in a direction from the right to the left of the operation surface 12b when the touch panel 12 is viewed from the front side thereof (step S104). In a case where the angle θ is included in the range from 45 degrees to 135 degrees (45°≦θ<135°), the operating control portion 104 determines that an operation and input is carried out in a direction from the top to the bottom of the operation surface 12b when the touch panel 12 is viewed from the front side thereof (step S105). In a case where the angle θ is included in the range from 135 degrees to 225 degrees (135°≦θ<225°), the operating control portion 104 determines that an operation and input is carried out in a direction from the left to the right of the operation surface 12b when the touch panel 12 is viewed from the front side thereof (step S106). In a case where the angle θ is included in the range from 225 degrees to 315 degrees (225°≦θ<315°), the operating control portion 104 determines that an operation and input is carried out in a direction from the bottom to the top of the operation surface 12b when the touch panel 12 is viewed from the front side thereof (step S107).

Although the operating control portion 104 determines in which range the angel θ is included among the four ranges, the method for detecting a direction of an operation and input is not limited to it. For example, the operating control portion 104 may determine in which range the angle θ is included among eight ranges. This allows the operating control portion 104 to properly detect a direction of an operation and input. Therefore, so many functions can be assigned to a certain region of touch panel 12.

As well as the first exemplary embodiment, as shown in FIG. 5, the touch panel 12 may overlap with the display unit 11 such that the operation surface 12b where an operation and input to the touch panel 12 is to be detected is parallel to the display surface 11b of the display unit 11 where an image is to be displayed.

If the enter region of operation surface 12b of the touch panel 12 is set as one region, four functions may be assigned to the enter region of operation surface 12b or the part 9A of the enter region of operation surface 12b, wherein the four functions are a function in a case where an operation and input is carried out in a direction from the right to the left of the operation surface 12b, a function in a case where an operation and input is carried out in a direction from the left to the right of the operation surface 12b, a function in a case where an operation and input is carried out in a direction from the bottom to the top of the operation surface 12b, and a function in a case where an operation and input is carried out in a direction from the top to the bottom of the operation surface 12b. So many functions can be assigned to a certain region of touch panel 12 by using the method for detecting a direction of an operation and input in the present embodiment.

As described the above, the operating control portion 104 calculates an angle θ between the certain line L and the line Lct connecting a point indicated by a close coordinate Pc on the operation surface 12b to a point indicated by a contact coordinate Pt on the operation surface 12b, and controls an operation of the controlled unit 1a based on the calculated angle θ. The electric device 100 allows the controlled unit 1a to carry out a different operation according to a situation before the pointing means F touches the touch panel 12. Further, when plural functions are assigned to a certain region of the touch pane 12, it is not necessary to divide the certain region of the touch panel 12 into plural parts each to which a different function is assigned. This allows a user to carry out an operation and input with respect to a wider region. As a result, it is possible to provide the user-friendly electric device and operating control method.

(Fourth Exemplary Embodiment)

Figure 11A:
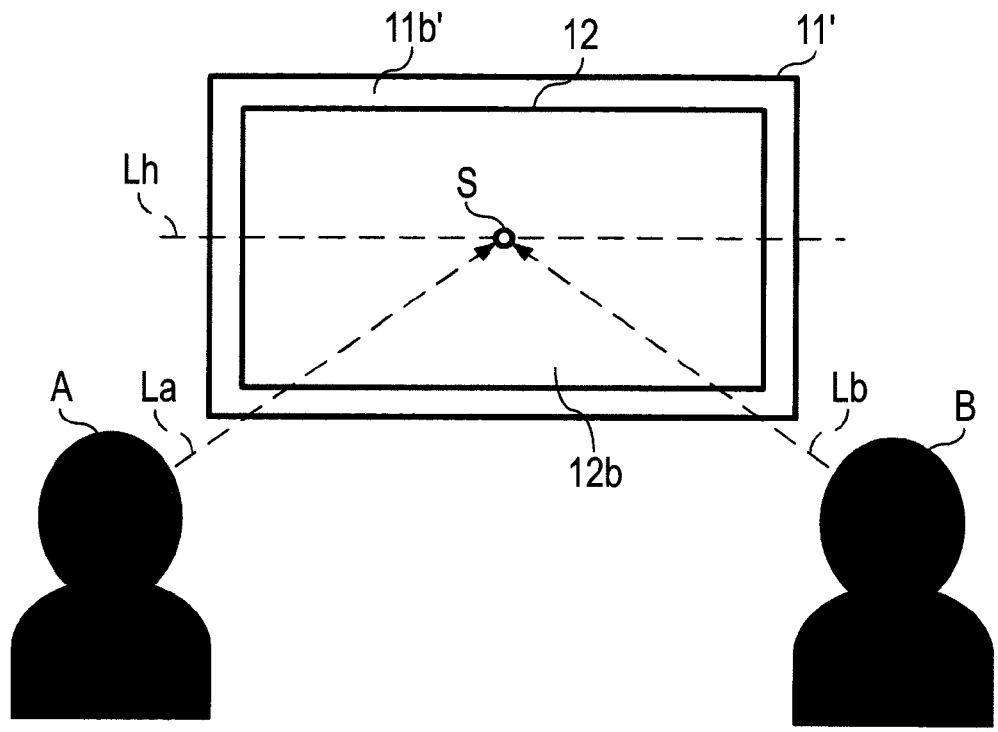
FIG. 11A is an appearance diagram that illustrates a display unit according to a fourth exemplary embodiment of the present invention.
Figure 11B:
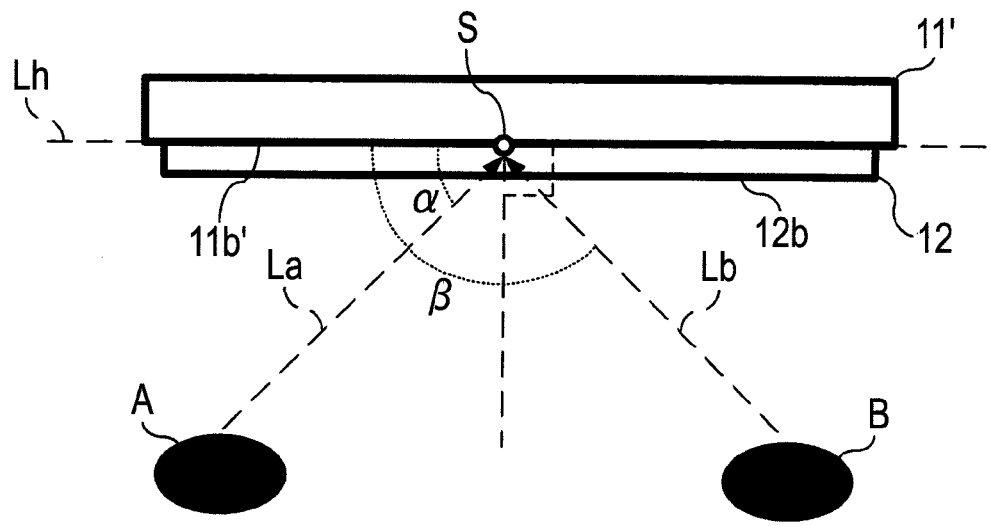
FIG. 11B is an overhead diagram that illustrates the display unit according to the fourth exemplary embodiment of the present invention.

A display unit 11' will be described with reference to FIGS. 11A and 11B. FIG. 11A is an appearance diagram in which the display unit 11' is viewed from the front side thereof. FIG. 11B is an overhead diagram in which the display unit 11' is viewed from above. The present embodiment is the same as the first exemplary embodiment, with the exception of the display unit 11. In the present embodiment, the display unit 11' is placed such that a display surface 11b' where an image is to be displayed is perpendicular to a horizontal surface. Users A and B focus on a point S on the display surface 11b' of the display unit 11' to watch an image which the display unit 11' displays.

In the present embodiment, an operation surface 12b where an operation and input to the touch panel 12 is to be detected has substantially the same size as the display surface 11b' where an image is to be displayed. The touch panel 12 overlaps with the display unit 11' such that the operation surface 12b of the touch panel 12 is parallel to the display surface 11b' of the display unit 11'. The display surface 11b' is formed into a substantially rectangle shape. The display unit 11' is placed such that two sides of the display surface 11b' is parallel to the horizontal surface.

In FIGS. 11A and 11B, a line La is a visual axis of the user A and connects the center of each eye of the user A and a watched object (point S), and a line Lb is a visual axis of the user B and connects the center of each eye of the user B and a watched object (point S). A line Lh passes the point S and is parallel to two sides which are parallel to the horizontal surface among four sides of the display surface 11b'.

The display unit 11' has a dual view function using the technique disclosed in Japanese Published Unexamined Application No. 2005-78076. The dual view function will be described below with reference to FIG. 11B. For an angle, an anticlockwise direction at a time when the display unit 11', the touch panel 12 and the users A and B are viewed from above is set as a positive direction.

The dual view function is a function for displaying a different image according to a visual angle between the line Lh and the visual axis (line La or Lb). Namely, the display unit 11' displays a different image according to a visual angle (an angle at which a user is in visual contact with an object). For example, the display unit 11' displays a different image according to a case where the visual angle is less than 90 degrees and a case where the visual angle is equal to or more than 90 degrees. As shown in FIG. 11B, if a visual angle α of the user A is 45 degrees and a visual angle β of the user B is 135 degrees, the display unit 11' allows the users A and B to be in visual contact with images which differ from each other. The controlled unit 1a instructs the display unit 11' to display two different images.

Figure 12A:
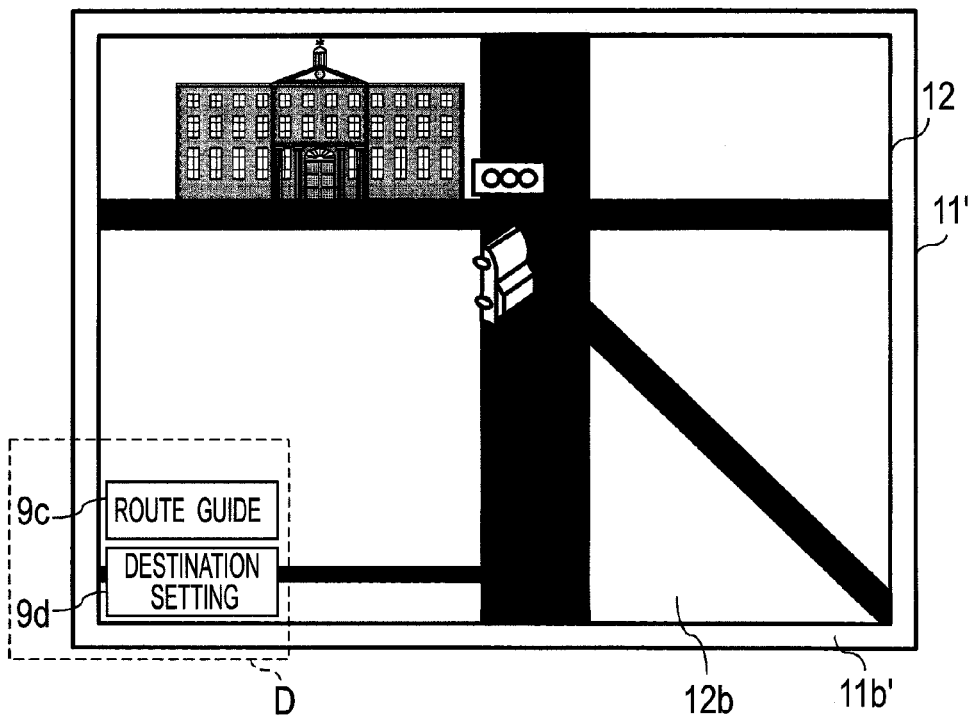
FIG. 12A is an appearance diagram that illustrates the display unit according to the fourth exemplary embodiment of the present invention.
Figure 12B:
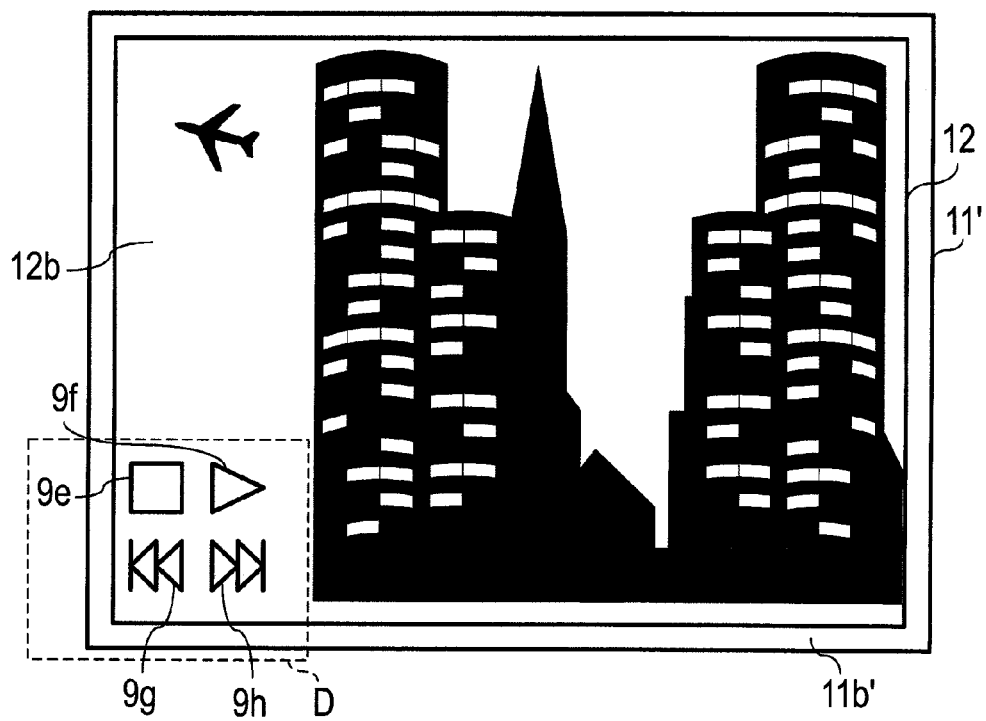
FIG. 12B is an appearance diagram that illustrates the display unit according to the fourth exemplary embodiment of the present invention.

FIG. 12A illustrates an image which the user A shown in FIG. 11A watches. OSDs 9c and 9d are superimposed on a map image, which is output from a navigation means (not shown) of the controlled unit 1a, and they are displayed. FIG. 12B illustrates an image which the user B shown in FIG. 11A watches. OSDs 9e to 9h are superimposed on an image based on contents data, and they are displayed.

Figure 13:
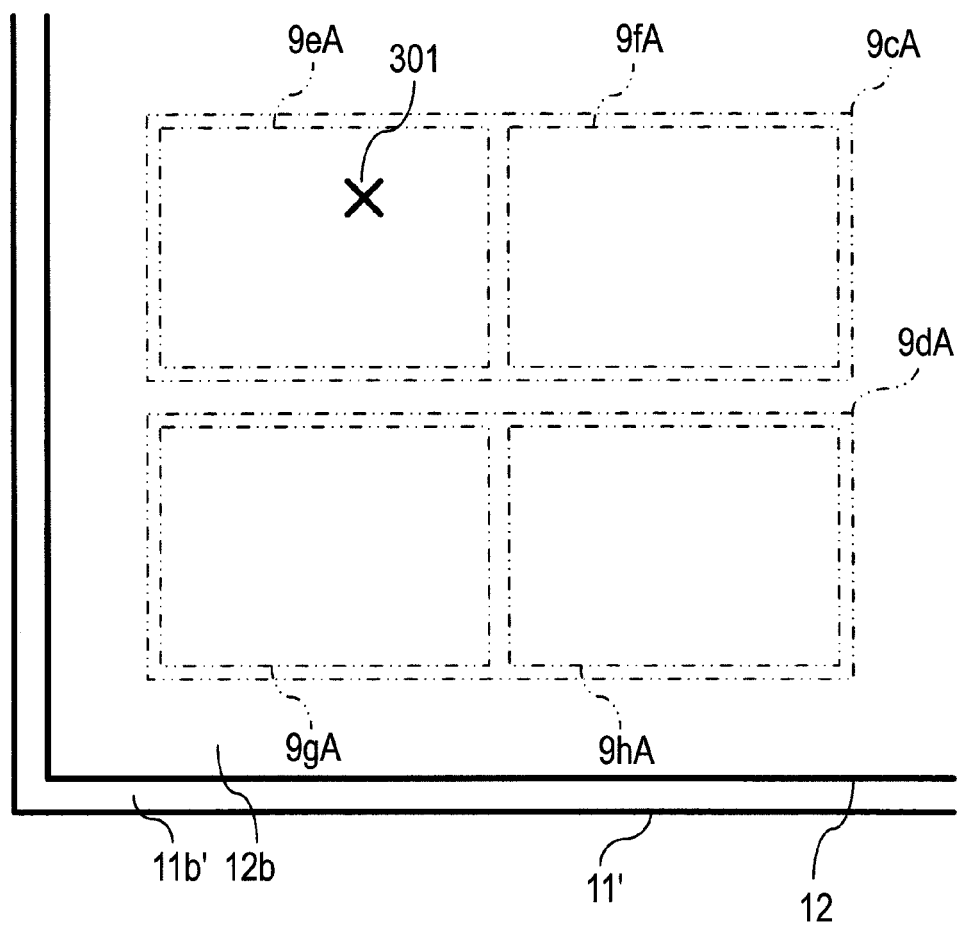
FIG. 13 is a schematic diagram that illustrates the display unit according to the fourth exemplary embodiment of the present invention.

FIG. 13 is an enlarged diagram of a part D in FIGS. 12A and 12B. In FIG. 13, functions corresponding to the OSDs 9c to 9h are assigned to parts 9cA to 9hA on the operation surface 12b of the touch panel 12 by the operating control portion 104. In this situation, when the user A who watches an image on which the OSD 9cA is displayed carries out an operation and input in a direction from the left to the right of the operation surface 12b with respect to the display unit 11' and contacts a point 301 included in the regions 9cA and 9eA, the operating control portion 104 detects the operation and input in the direction from the left to the right of the operation surface 12b. Then, the operating control portion 104 instructs the controlled unit 1a to execute a function corresponding to the OSD 9c included in the image watched by the user A. For example, the function corresponding to the OSD 9c is a function for instructing the navigation means to start a route guide.

Also, when the user B who watches an image on which the OSD 9eA is displayed carries out an operation and input in a direction from the right to the left of the operation surface 12b with respect to the display unit 11' and contacts the point 301 included in the regions 9cA and 9eA, the operating control portion 104 detects the operation and input in the direction from the right to the left of the operation surface 12b. Then, the operating control portion 104 instructs the controlled unit 1a to execute a function corresponding to the OSD 9e included in the image watched by the user B. For example, the function corresponding to the OSD 9e is a function for instructing the controlled unit 1a to stop reproducing contents data.

Thus, even if a user contacts the same point 301 on the touch panel 12, the operating control portion 104 instructs the controlled unit 1a to execute a different operation according to a detected direction of an operation and input. The operating control portion 104 controls the controlled unit 1a to instruct the display unit 11' to display the OSDs 9c and 9d representing functions to be executed at a time when an operation and input is carried out in a direction from the left to the right of the operation surface 12b as an image with which a user is in visual contact from the left side (at a time when the visual angle is less than 90 degrees). Also, The operating control portion 104 controls the controlled unit 1a to instruct the display unit 11' to display the OSDs 9e to 9h representing functions to be executed at a time when an operation and input is carried out in a direction from the right to the left of the operation surface 12b as an image with which a user is in visual contact from the right side (at a time when the visual angle is equal to or more than 90 degrees).

Under this configuration, the operating control portion 104 allows only user A, for which there is a high possibility of carrying out an operation and input in a direction from the left to the right of the operation surface 12b, to be in visual contact with the OSD 9c and 9d which represent functions to be executed at a time when an operation and input is carried out in a direction from the left to the right of the operation surface 12b. Also, the operating control portion 104 allows only user B, for which there is a high possibility of carrying out an operation and input in a direction from the right to the left of the operation surface 12b, to be in visual contact with the OSD 9e to 9h which represent functions to be executed at a time when an operation and input is carried out in a direction from the right to the left of the operation surface 12b.

It is noted that the present invention includes programs which instruct a computer to realize functions of the control unit 1 according to each embodiment. These programs may be read from a record medium and loaded into the computer or transmitted via a communication network and loaded into the computer.

The present invention is not limited to each embodiment described above and various changes may be made without departing from the scope of the invention. For example, the touch panel 12 is not limited to the touch panel with capacitances. An operation and input to the touch panel 12 may carried out using an object other than a user's finger. The control unit 1 may be realized by one central processing unit, or plural central processing units or other devices cooperate to execute functions of the control unit 1.

The position detecting portion 101 may detect a close coordinate Pc using a close detection sensitivity or a detection sensitivity (contact detection sensitivity) other than the close detection sensitivity. The position detecting portion 101 may detect a contact coordinate Pt using a contact detection sensitivity or a detection sensitivity other than the contact detection sensitivity. For example, the position detecting portion 101 may detect a contact coordinate Pt using a detection sensitivity lower than the contact detection sensitivity.

In each embodiment, the close detection sensitivity is used as a detection sensitivity at a time of sensing that the pointing means F comes close to the touch panel 12 until a point on the close plane Cp, and the contact detection sensitivity is used as a detection sensitivity at a time of sensing that the pointing means F comes close to the touch panel 12 until a point on the contact plane Tp. However, the detection sensitivities at times of detecting the close coordinate Pc and the contact coordinate Pt are not limited to it.

What is claimed is:
1. An electronic device comprising:
a touch panel to be operated by a pointing means;
a position detecting portion that detects, when sensing that the pointing means comes close to a first position away from the touch panel by a first distance, a first coordinate on the touch panel corresponding to the first position, and detects, when sensing that the pointing means comes close to a second position lying closer to the touch panel than the first position, a second coordinate on the touch panel corresponding to the second position;

an operating control portion that controls an operation of a controlled portion based on the first coordinate and the second coordinate; and a detection sensitivity control portion that switches, after the position detecting portion senses that the pointing means comes close to the first position, detection sensitivity of the position detecting portion from first sensitivity to the second sensitivity, wherein the position detecting portion is capable of sensing that the pointing means comes close to the first position in the first sensitivity, and the position detecting portion is capable of sensing that the pointing means comes to close the second position in the second sensitivity.

2. The electronic device according to claim 1, wherein the operating control portion controls the operation of the controlled portion based on an X difference value between an X coordinate value of the first coordinate and an X coordinate value of the second coordinate or a Y difference value between a Y coordinate value of the first coordinate and a Y coordinate value of the second coordinate.

3. The electronic device according to claim 1, wherein the operating control portion calculates an X difference value between an X coordinate value of the first coordinate and an X coordinate value of the second coordinate and a Y difference value between a Y coordinate value of the first coordinate and a Y coordinate value of the second coordinate, compares an absolute value of the X difference value with an absolute value of the Y difference value, selects either one of the X difference value and the Y difference value according to the comparison result, and controls the operation of the controlled portion based on the selected difference value.

4. The electronic device according to claim 1, wherein the operating control portion calculates an angle between a line connecting a point indicated by the first coordinate to a point indicated by the second coordinate and a certain line on an operation surface of the touch panel, and controls the operation of the controlled portion based on the calculated angle.

5. The electronic device according to claim 1, further comprising a display portion that is arranged to correspond to the touch panel and displays a different image thereon depending on a visual angle.

6. An operating control method for controlling an operation of an electronic device having a touch panel to be operated by a pointing means, the method comprising:

detecting, when sensing that the pointing means comes close to a first position away from the touch panel by a first distance, a first coordinate on the touch panel corresponding to the first position under a situate where detection sensitivity is set to first sensitivity;

switching, after sensing that the pointing means comes close to the first position, the detection sensitivity from the first sensitivity to second sensitivity capable of sensing that the pointing means comes to close a second position lying closer to the touch panel than the first position;

detecting, when sensing that the pointing means comes close to the second position, a second coordinate on the touch panel corresponding to the second position; and controlling an operation of an controlled portion of the electronic device based on the first coordinate and the second coordinate.

* * * * *